3,411,920
PROCESS FOR THE MANUFACTURE OF COTTAGE CHEESE

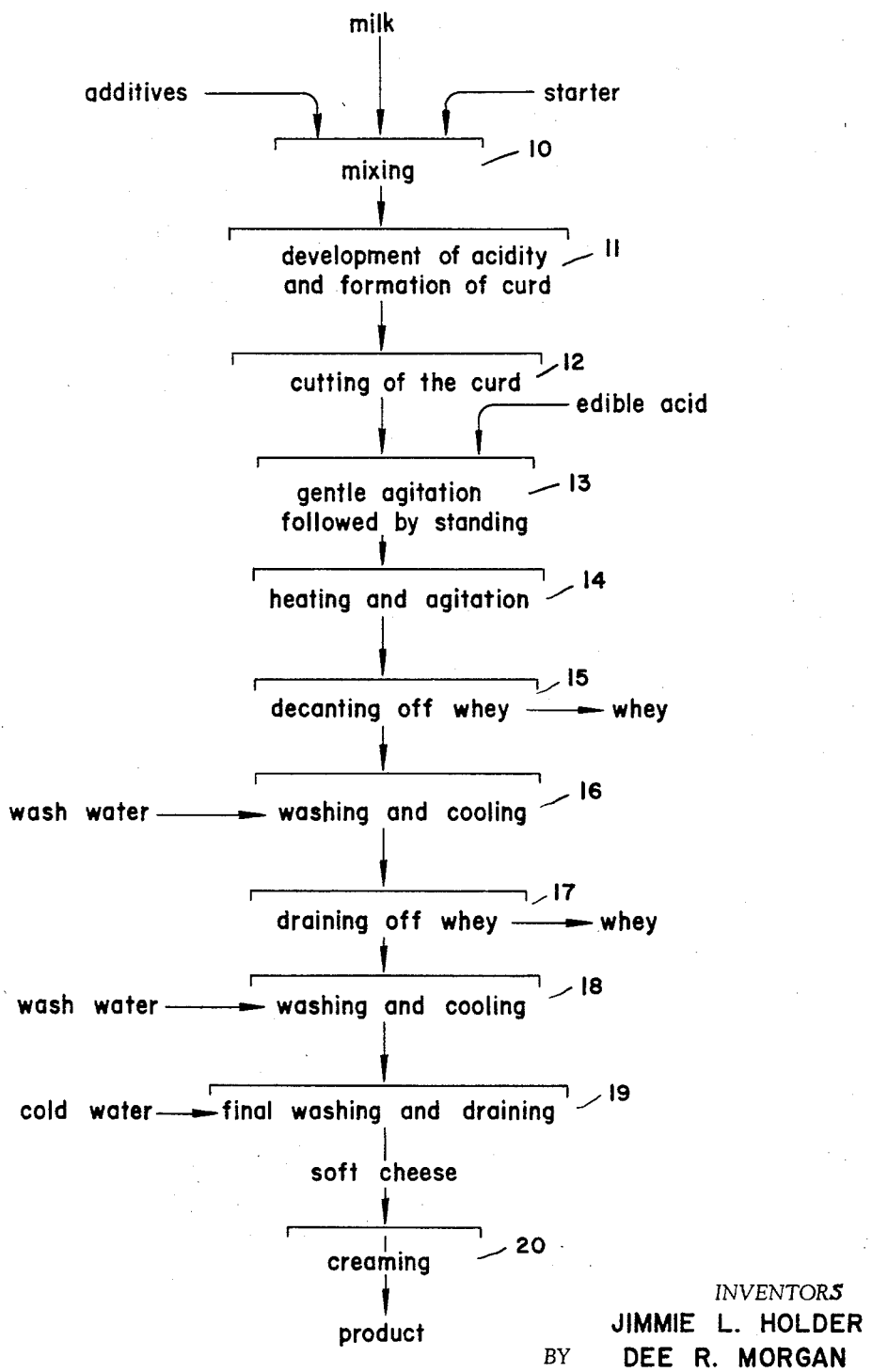

Jimmie L. Holder, Hanford, and Dee R. Morgan, Moraga, Calif., assignors to Safeway Stores, Incorporated, Oakland, Calif., a corporation of Maryland
Filed July 6, 1965, Ser. No. 469,527
7 Claims. (Cl. 99—116)

ABSTRACT OF THE DISCLOSURE

Process for the manufacture of soft unripened cheese (e.g., cottage cheese). Liquid milk is coagulated in the presence of acid forming bacteria to form a curd and whey. After the curd is cut, an edible acid is added to increase the acidity of the whey (e.g., to pH 4.4 or lower), after which the mass is heated to firm the curd.

---

This invention relates generally to processes or methods for the manufacture of soft unripened cheese, or what is commonly known as cottage cheese.

In the manufacture of cottage cheese, it is conventional practice to inoculate liquid milk with a suitable starter, after which a coagulating acidity is developed over an incubating period to form curd. By way of example, in a typical instance the titratable acidity immediately after forming the curd is of the order of 0.45 to 0.55% (expressed as lactic acid), the corresponding hydrogen ion value being of the order of pH 4.65 to 4.8. Following formation of curd, it is conventional practice to cut the curd, and then harden the curd by a heat treatment or cooking operation, in which the mass is heated to a temperature of about 105° F. over a period of from 60 to 90 minutes, with lowering of the pH to 4.5 to 4.6, and then heated to a higher temperature level within the range of from 120 to 130° F. over a further period of from about 45 to 75 minutes. If it is attempted to heat the mass more rapidly, heating will proceed faster than acid production, and the curd surface will firm too rapidly and become matted and tough during cooking. If the acid development during this period proceeds too rapidly whereby the pH of the curd falls below 4.55 at the time the temperature level of 105° F. is reached, the curd has a tendency to readily shatter and will not firm properly during cooking. In some instances the residual whey is neutralized during this heat treatment, if the pH falls below 4.6, as for example by the addition of basic salts or by dilution with water.

Our invention has been predicated upon the discovery that if the pH of the whey immediately after cutting is lowered by the addition of acid, a number of unexpected benefits are obtained. After such adjustment of the pH value of the whey, the curd is at one pH value and the whey at a lower pH. Under such conditions, the desirable effects of both low and high acid curd can be obtained, as will be presently explained.

In general, it is an object of the present invention to provide an improved process for the manufacture of unripened cheese, which will afford higher yields compared with conventional processes.

Another object of the invention is to provide a process of the above character which will produce a form of unripened cheese or cottage cheese having superior texture and more uniform curd size.

Another object of the invention is to provide a process of the above character which makes possible more rapid cooking of the curd with resulting time saving.

Additional objects and features of the invention will appear from the following description in which the preferred embodiment has been set forth in detail in conjunction with the accompanying drawing, in which FIGURE 1 is a flow sheet illustrating one manner of practicing our process.

As illustrated in the flow sheet, the initial steps for coagulating milk may follow conventional practice. Thus, milk is shown being supplied to mixing step 10 where a suitable starter is introduced together with one or more additives, such as rennet. The starter is usually one of the lactic acid forming bacteria type. The milk employed may be either fresh or reconstituted, and generally it has a minimum of fat content. However, for particular types of cottage cheese, varying amounts of fat may be present.

In step 11, the inoculated milk is held under controlled temperature conditions, during which time lactic acid develops, and eventually a coagulating acidity is reached with resulting coagulation and formation of the desired curd. After coagulation of the milk, the curd is cut by conventional procedures and equipment as indicated in step 12. At this time, the mass consists of the cut curd together with whey. Assuming that the process is carried out batch fashion, the amount of free liquid whey is sufficient to cover the cut curd to a substantial depth. An amount of edible acid is now added in step 13 to reduce the pH of the whey to a value of the order of 4.0 to 4.6, preferably 4.3 to 4.4. The acid employed may, for example, be citric, phosphoric, acetic, lactic or tartaric. Citric and phosphoric are deemed preferable because the presence of residual amounts of such acids in the finished product is compatible with flavor requirements. Preferably the acid is added as a water solution, as for example, a 50% solution of citric acid in water. A suitable procedure is to add the citric acid solution to the free whey at the top of the mass, and then cause it to be dispersed throughout the free whey of the mass by gentle agitation. Such agitation also causes some additional separation of whey from the curd.

After the addition of acid and gentle agitation as described above, which in a typical instance will be carried out over a period of the order of from 2 to 7 minutes, the mass is permitted to stand without further agitation for a period of the order of from 5 to 15 minutes to allow for further expulsion of whey from the curd, with firming of the curd. While subsequent heating in step 14 may be started at the end of the period just specified, we have found that heating may commence about 2 minutes after the acid is added, provided the curd is not agitated for a period of from 5 to 15 minutes after the acid has been dispersed in the whey.

Heating in step 14 serves to harden the curd. In general, it has been found that our curd can be heated more rapidly than with conventional cooking operations, and that the over-all cooking period may be greatly shortened. We prefer to cook to temperature levels substantially higher than those generally employed in conventional processes, as for example, a level within the range of 126 to 140° F. (130 to 135° F. preferred). Thus heat can be applied to the mass in step 14 to elevate the temperature from ambient to a level within the range of from 126 to 140° F. over a period of the order of from 50 to 115 minutes, and then held at such temperature level for a period of the order of from 5 to 15 minutes, to effect cooking and firming to the desired degree. The over-all period of time required for step 14 may be of the order of 75 to 120 minutes, in contrast with time periods of the order of 105 to 165 minutes used in conventional processes.

Following heat treatment in step 14, the mass is subjected to further operations for the removal of whey and for washing the curd. This can be carried out by removing free whey in step 15, as by decantation, after which wash water is applied in step 16, and whey diluted with wash water is removed in step 17 as by drainage. A further application of wash water and subsequent drainage of diluted whey is indicated in steps 18 and 19. Application of wash water (e.g. trap water) in step 16 serves to reduce the temperaure of the curd, as for example, to a temperature level of the order of from 80 to 90° F. In step 18, the temperature is reduced by a second wash water to a level of the order of from 60 to 70° F., and finally in step 19, to a level of the order of 38 to 45° F. by addition of a cold wash water. After step 19, the washed curd can be used as such, or preferably is subjected to creaming in step 20, which can be carried out by conventional procedures to produce the final cottage cheese product.

A specific example of the process described above is as follows.

The source material employed was pasteurized skim milk. 950 gallons of such milk at 93° F. was placed in a suitable vat. A lactic acid starter was prepared in the manner described in Dahlstrom Patent 3,017,274, and 550 gallons of such starter at 85° F., having a non-coagulating acidity of 0.35%, was added to the skim milk. To this mixture at 90° F. was added 10 ml. of rennet. The mixture was permitted to stand for a period of 3 hours and 15 minutes, during which time the acidity developed to 0.50%, corresponding to a pH of 4.7. The curd was then cut with conventional 5/16 inch curd knives. A citric acid solution was prepared by dissolving 8 lbs. of food grade citric acid in 2 gallons of water. The curd was gently agitated after cutting to begin the expulsion of whey from the curd, and at that time the citric acid was added by pouring it on the surface of the whey overlying the curd, the gentle agitation serving to distribute the added acid throughout the vat. The mass was then allowed to stand for 15 minutes during which time there was some further expulsion of whey from the curd, and some firming of the curd. The curd and whey at that time was at a temperature of about 90° F. Heating was then started using a jet type cooker which heated the whey by injection of steam. Five minutes after the heating was started, mechanical agitators were turned on slow speed and the heating continued at a steady rate, whereby the temperature of 132° F. was reached in a period of ninety minutes. The whey overlying the curd was then drained off down to the level of the top of the curd, and thereafter wash water at about 72° F. was added to cause the temperature of the curd to be lowered to about 80° F. Thereafter whey diluted with wash water was drained from the curd. Two additional wash waters were then applied to the curd whereby the curd temperature was reduced to 60° and 40° respectively. After final draining, the curd was creamed and packaged for sale.

The process described above has a number of desirable features. Particularly, the process makes possible a substantial increase in yield of cottage cheese. For example, in comparison with a conventional process having yields of 1.5 to 1.6 lbs. of cottage cheese per pound of milk solids, by application of our process the yield can be increased to 1.8 to 2.0 lbs. of cheese. In accordance with our observations, this is due to the fact that our process produces a firmer curd which has less tendency to shatter during cooking, and in addition more milk solids are retained within the curd particle. Also there is less tendency for matting in the acidified whey whereby cooking can be carried out with less agitation, and thus the loss from mechanical break-up of the curd during cooking is reduced. In general, it can be said that use of our process makes possible an increase in yield of from 15 to 30%.

A further feature pointed out in the foregoing description is that our process permits more rapid heating in the cooking operation, and heating to higher temperatures, with a substantial decrease in the over-all cooking time. This enables substantial cost savings, and increases the capacity of a given plant. The quality of the curd obtained is improved with respect to conventional cottage cheese, and there is also an improvement with respect to the keeping quality of the finished product. This is attributed to the fact that higher cooking temperaures are employed without excessive firming of the curd. According to our observations, such higher cooking temperatures effectively pasteurize the cheese, resulting in improved keeping properties with the elimination of sour and bitter flavors that are common with conventional processes.

In the foregoing specific example, the steps preceding cutting of the curd were in accordance with Dahlstrom 3,017,274. However, the process is equally applicable to conventional procedures for coagulating the milk and where the starter is not of the noncoagulating low acid type.

We claim:
1. In a process for the manufacture of soft unripened cheese from liquid milk comprising the steps of coagulating the milk in the presence of acid forming bacteria to form a mass comprising curd and whey, the whey having a hydrogen ion concentration of from pH 4.65 to 4.8, cutting the curd, adding an edible acid to the whey to adjust the hydrogen ion concentration of the same to a pH value within the range of pH 4.0 to 4.4, subjecting the mass to heat treatment at an elevated temperature to firm the curd, and then separating curd from the whey and subjecting the curd to washing.

2. A process as in claim 1 in which the hydrogen ion concentration of the whey is adjusted to pH 4.3 to 4.4.

3. A process as in claim 1 in which the heat treatment of the mass is to an elevated temperature of from 126 to 140° F.

4. A process as in claim 1 in which the heat treatment is to a temperature of from 130 to 135° F. over a period of from 75 to 120 minutes.

5. A process as in claim 1 in which the mass is held for a period of at least about 2 minutes after adding the acid and before commencing heating of the same.

6. In a process for the manufacture of soft unripened cheese comprising the steps of effecting coagulation of skim milk in the presence of lactic acid forming bacteria and rennet to form a mass comprising curd and whey, the whey having a hydrogen ion concentration within the range of pH 4.65 to 4.8, cutting the curd, immediately adding a solution of an edible acid to adjust the hydrogen ion concentration of the free whey to a pH value within the range of pH 4.0 to 4.4, holding the mass with substantially all of the whey for a period of at east 2 minutes, subjecting the mass with substantially all of the whey to heat treatment in which the mass is heated to an elevated temperature within the range of from 130 to 135° F. over a period of the order of 75 to 120 minutes, draining the free liquid whey from the curd, and then washing the curd with cold water.

7. A process as in claim 6 in which the hydrogen ion concentration of the whey is adjusted within the range of pH 4.3 to 4.4.

References Cited

UNITED STATES PATENTS 3,017,274  1/1962  Dahlstrom _____ 99—116
3,117,870  1/1964  Hussong et al. _____ 99—116

A. LOUIS MONACELL, *Primary Examiner.*

D. M. NAFF, *Assistant Examiner.*